United States Patent [19]

Sekiguchi

[11] Patent Number: 5,222,407
[45] Date of Patent: Jun. 29, 1993

[54] SLIP CLUTCH MECHANISM

[75] Inventor: Tetsuo Sekiguchi, Kumagaya, Japan

[73] Assignee: Asahi Kogaku Kogyo Kabushiki Kaisha, Tokyo, Japan

[21] Appl. No.: 885,889

[22] Filed: May 20, 1992

[30] Foreign Application Priority Data

May 21, 1991 [JP] Japan .................... 3-218140

[51] Int. Cl.⁵ ............................................. F16H 57/00
[52] U.S. Cl. ................................ 74/411; 74/421 A; 192/56 R; 464/38
[58] Field of Search ............... 74/411, 421 R, 421 A; 192/56 R; 464/38, 39, 44, 46, 47, 48

[56] References Cited

U.S. PATENT DOCUMENTS

| | | | |
|---|---|---|---|
| 1,968,604 | 7/1934 | Hertz et al. | 74/411 X |
| 2,102,002 | 12/1937 | Hill | 74/411 X |
| 2,145,083 | 1/1939 | Dynes | 464/38 X |
| 2,475,329 | 5/1949 | Leathers et al. | 74/411 X |
| 2,913,885 | 11/1959 | DeBrie | 464/47 X |
| 3,064,455 | 11/1962 | Gros | 464/47 |
| 3,073,176 | 1/1963 | Daugirdas | 74/421 A |
| 4,796,045 | 1/1989 | Hamanishi et al. | 354/400 |
| 5,092,440 | 3/1992 | Nakano | 464/47 X |

FOREIGN PATENT DOCUMENTS 63-100710  6/1988  Japan.
644496 10/1950 United Kingdom.
822378 10/1959 United Kingdom.

OTHER PUBLICATIONS

United Kingdom Search Report.

*Primary Examiner*—Allan D. Herrmann
*Assistant Examiner*—David W. Laub
*Attorney, Agent, or Firm*—Sandler Greenblum & Bernstein

[57] ABSTRACT

A slip clutch mechanism is provided with a clutch shaft rotated by a driving power source, a pair of slip pinions supported on the clutch shaft in such a manner as to be rotatable around the clutch shaft, and a pair of slip washers supported on the clutch shaft, in such a manner as to be rotatable as unified with the clutch shaft and movable in the axial direction of the clutch shaft and as to get into frictional contact with the individual sliding pinions at the inner sides thereof. A compression coil spring member is interposed between the slip washers and brings the slip washers into frictional contact with the slip pinions. An output shaft is rotated by one of the pair of slip pinions.

17 Claims, 3 Drawing Sheets

SLIP CLUTCH MECHANISM

BACKGROUND OF THE INVENTION

The present invention relates to a slip clutch mechanism using frictional engaging force, such as a small-sized slip clutch mechanism appropriate for being built, for example, into a camera.

A slip clutch mechanism has hitherto been known in various types of construction. In this regard, it has been necessary to make a spring large in order to produce a large sliding torque in a clutch mechanism which obtains its sliding torque by the use of the force derived from the spring.

The present applicant has developed an apparatus for driving a group of lenses having variable magnifications with a driving motor for zooming. The motor is built into the apparatus for driving the zoom lens and is used as an interchangeable lens for a single lens reflex camera, and is commonly known as a power zoom lens. For the lens barrel for such a power zoom lens, a slip clutch mechanism is indispensable because the variable magnification lens group must be stopped even if the motor continues to rotate when the variable magnification lens group has reached its telescopic end or a wide angle end, and in case an excessive load has been exerted. However, an interchangeable lens has such a limited space that it is difficult to increase the sliding torque by employing a larger spring, which presents the problem that it is not possible to obtain the necessary sliding torque for such a variable magnification lens group, because of the limiting factors such as the weight of the lens group. Also, the conventional slip clutch mechanism is liable to the occurrence of a slip in it in consequence of the dead load of the variable magnification lens group. Thus, it has been desired that these problems inherent in the conventional slip clutch mechanism will be resolved.

SUMMARY OF THE INVENTION

The present invention has been made in consideration of the circumstances described above. The object of the present invention is to offer a slip clutch mechanism which is capable of generating a large sliding torque even in a narrow space, such as the area inside an interchangeable lens.

In order to overcome the problems described above, and to attain the object mentioned above, the slip clutch mechanism, according, one aspect of the present invention, is provided with a clutch shaft which is rotated by a driving power source, at least one pair of slip pinions supported on the clutch shaft in such a manner as to be rotatable round the clutch shaft, a pair of slip members supported on the clutch shaft in such a manner as to be rotatable as unified with the clutch shaft and movable in an axial direction of the clutch shaft, and as to get into frictional contact with the slip pinions at an inner side of each of said slip pinions, compression spring means interposed between the slip members and bringing these slip members into their frictional contact with the slip pinions, and an output shaft rotated by at least one of the pair of slip pinions.

The present invention embodies the idea that a sliding area is formed by a compression spring member between one pair of slip pinions, and slip members, arranged on both sides of the individual slip pinions, in order that the sliding torque may be increased thereby in a limited space.

BRIEF DESCRIPTION OF THE DRAWINGS

The manner in which the above objects, features and advantages of the present invention are attained will be fully evident from the following detailed description when it is considered in light of the drawings, wherein.

DETAILED DESCRIPTION OF PREFERRED EMBODIMENT

Now, the construction of one example of preferred embodiment of a the slip clutch mechanism according to the present invention will be described with reference to the accompanying drawings, in which the slip clutch mechanism is applied to an electrically operated zoom lens for a camera.

Figure 5:
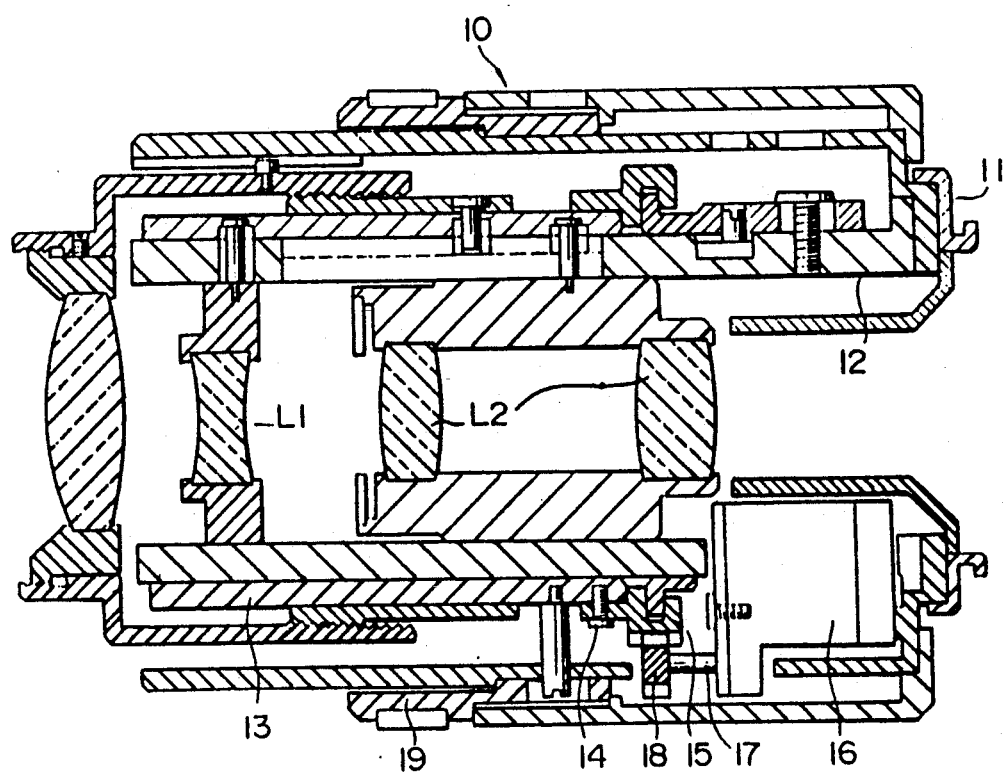
FIG. 5 is a sectional view illustrating the configuration of a lens barrel for a power zoom lens provided with the slip clutch mechanism shown in FIG. 1.

First, with reference to FIG. 5, a description will be made of the construction of a lens barrel 10 for an electrically operated zoom lens.

This lens barrel 10 is provided with a stationary ring 12, which is fixed on the camera body by way of an attaching mount 11. On the outer circumference of this stationary ring 12, a cam ring 13 is set in such a way as to be permitted to rotate freely round the optical axis of the stationary ring 12. On this cam ring 13, a gear ring 15 is fixed with a fixing screw 14. With this gear ring 15, an output pinion 18 fixed coaxially on an output shaft 17 of a speed reducing motor unit 16, which is provided with a slip clutch mechanism constituting a characteristic feature of the present invention, is set in engagement. With the driving force put forth by this speed reducing motor unit 16 and transmitted to the cam ring 13 via the output pinion 18, the cam ring 13 is set into its rotation, by which a cam groove (not illustrated in FIG. 5) formed on the cam ring 13 moves the variable magnification lens groups L1 and L2, which are thereby put into a zooming operation. In this regard, a manual zoom ring 19, which is to be used for manually rotating the cam ring 13, is fitted into the outer circumference of the cam ring 13, so that the manual zoom ring 19 may rotate freely round the optical axis.

Next, with reference to FIG. 1. through FIG. 4, the internal construction of the speed reducing motor unit 16 mentioned above will be described in detail.

Figure 1:
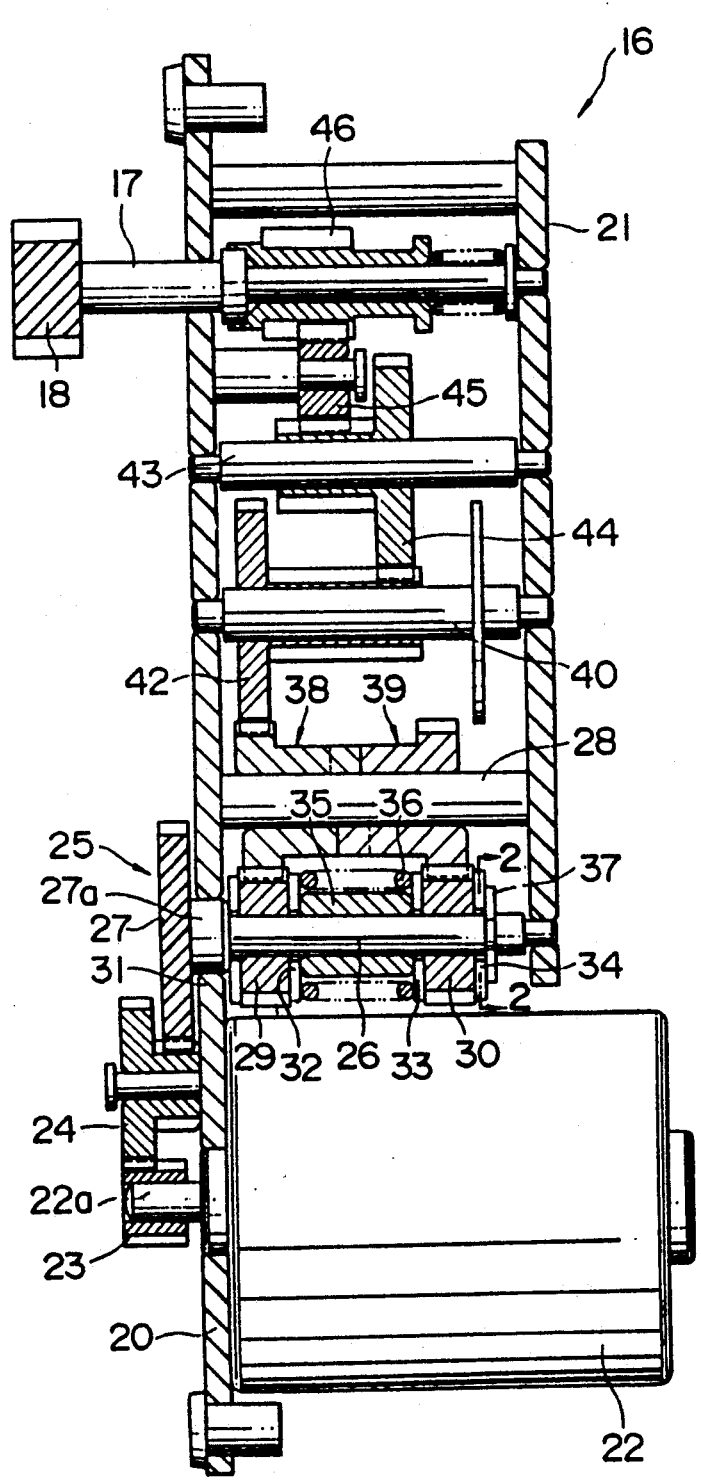
FIG. 1 is a sectional drawing illustrating the construction of one example of preferred embodiment of the slip clutch mechanism according to the present invention.

As shown in FIG. 1, this speed reducing motor unit 16 is provided with a main plate 20 as a substrate for it, and a support plate 21, which is separated by a predetermined distance from the main plate 20 and is in parallel with the main plate 20. Main plate 20 has a driving motor for zooming 22 installed on it. Moreover, the output shaft 17, mentioned above is supported axially on main plate 20 and support plate 21 in such a manner that the output shaft 17 may rotate freely, and the axial line of rotation of output shaft 17 and that of the motor shaft 22a of the driving motor for zooming 22 are set in parallel with each other. On the distal end of motor shaft 22a, a driving side pinion 23 is fixed coaxially. Driving side pinion 23 is in mesh with an idle gear 24 rotatably supported to the main plate 20. A slip clutch mechanism 25, which constitutes a feature characteristic of the present invention, is interposed between idle gear 24 and the output pinion 18 mentioned above.

The construction of this slip clutch mechanism 25 will now be described in detail. Slip clutch mechanism 25 is provided with a clutch shaft 26 axially supported between the main plate 20 and the support plate 21 mentioned above in such a manner that the clutch shaft 26 may rotate freely round the axial line of rotation parallel with the axial line of rotation of the motor shaft 22a for the driving motor for zooming 22. Clutch shaft 26 protrudes outward beyond the main plate 20, and, on this protruding end, an input gear 27, which is to be set into mesh with the idle gear 24 is fixed coaxially. The input gear 27 includes a flange portion 27a coaxially and integrally thereto. The inner surface (i.e., right end surface in FIG. 1) of the flange portion 27a is set to protrude inward of the main plate 20.

Also, an idle shaft 28 is supported on main plate 20 in such a way that the idle shaft 28 may freely rotate round an axial line of rotation in parallel with the axial line of rotation of the clutch shaft 26. A sliding mechanism part is interposed between clutch shaft 26 and idle shaft 28.

Clutch shaft 26 is fitted with a pair of slip pinions 29 and 30 in a state sepatated from each other in the axial direction in such a manner that they may respectively rotate freely round the clutch shaft 26 and may also slip freely in the axial direction. In the meantime, a pair of slip washers 31 and 32, respectively for right and left, are fitted, in a manner permitting them to move freely in the axial direction, on the outer circumference of clutch shaft 26 in a state in which they hold the slip pinion 29 on both of the right and the left sides thereof. Similarly, on the outer circumference of clutch shaft 26, a pair of slip washers 33 and 34, respectively for right and left, also are fitted, in a manner permitting them to move freely in the axial direction, in a state in which they hold the slip pinion 30 on both of the right and the left sides thereof.

Figure 2:
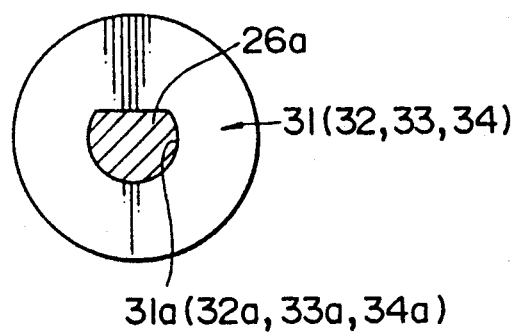
FIG. 2 is a sectional drawing illustrating the slip clutch mechanism shown in FIG. 1 as taken along the line 2—2.

The clutch shaft 26 is formed with a non-circular shaft part 26a in a sectional shape formed into the so-called D-cut shape, as illustrated in FIG. 2. Moreover, the individual slip washers 31, 32, 33, and 34 have non-circular holes 31a, 32a, 33a, and 34a formed in them, so that they accept the non-circular shaft part 26a in the D-cut shape in a mutually complementary manner. Thus, the individual slip washers 31, 32, 33, and 34 rotate as unified with the clutch shaft 26 while the individual slip washers 31 through 34 are permitted freely to move in the axial direction in relation to the clutch shaft 26 and in accordance with the rotation of this clutch shaft 26.

A spacer ring 35 is inserted in the outer circumference of the clutch shaft 26 in the state in which the spacer ring 35 is positioned between the inner side slip washers 32 and 33 facing each other. Also, a compression coil spring 36 is set around the outer circumference of this spacer ring 35. Both ends of this compression coil spring 36 are respectively in direct contact with respective inner side slip washers 32 and 33, and apply force to the slip washers 32 and 33 in the direction in which they are moved away from each other—in other words, apply force to the slip washers 32 and 33 for their movement in the leftward direction and in the rightward direction, respectively, as shown in FIG. 1.

Figure 4:
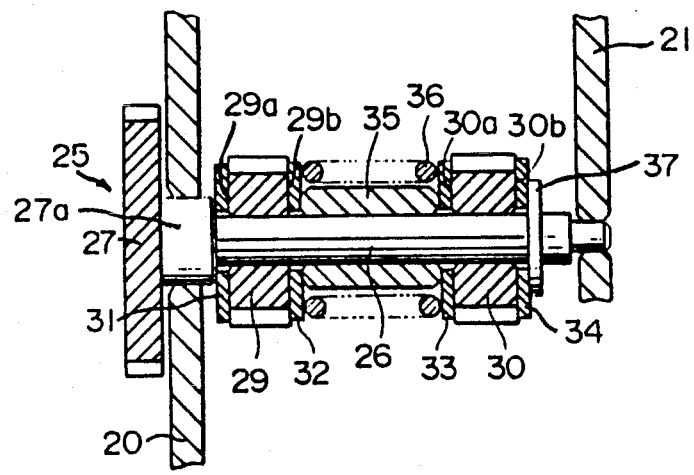
FIG. 4 is a sectional view illustrating the slip clutch mechanism shown in FIG. 1 (which is represented in a magnified state in FIG. 1.

With the force exerted by this compression coil spring 36 toward the left as shown in FIG. 4, the slip washer 32 is pushed onto the right end surface 29b of the slip pinion 29, as shown in FIG. 4 and applies force to the slip pinion 29 for its movement toward the left in the FIG. 4. Then, the left end surface 29a of the slip pinion 29 thus pushed toward the left in FIG. 4 will be pressed against the inner surface of the flange portion 27a of the input gear 27 by way of the slip washer 31. In the meantime, the slip washer 33 is pressed against the left end surface 30a of the slip pinion 30 by the force exerted by this compression coil spring 36 in the rightward direction in FIG. 4, pushing the slip pinion 30 toward the right in FIG. 4. Then, the right end surface 30b of this slip pinion 30, thus pushed toward the right in FIG. 4, will be pressed, via the slip washer 34, against the inner surface of a stopper ring 37 which is fixed to or held in engagement with the outer circumferential surface of the clutch shaft 26.

These operations generate frictional force between the individual slip pinions 29 and 30 on one hand and the single pair of the slip washers 31 and 32 and another single pair of slip washers 33 and 34 on the other, which are positioned on the right and on the left, respectively, in correspondence with the slip pinions 29 and 30. That is to say, this construction, which is provided with only one compression coil spring 36, is capable of generating frictional force between the two slip pinions 29 and 30 and the clutch shaft 26 (in other words, between four end surfaces 29a, 29b, 30a, and 30b and the corresponding slip washers 31, 32, 33, and 34).

Figure 3:
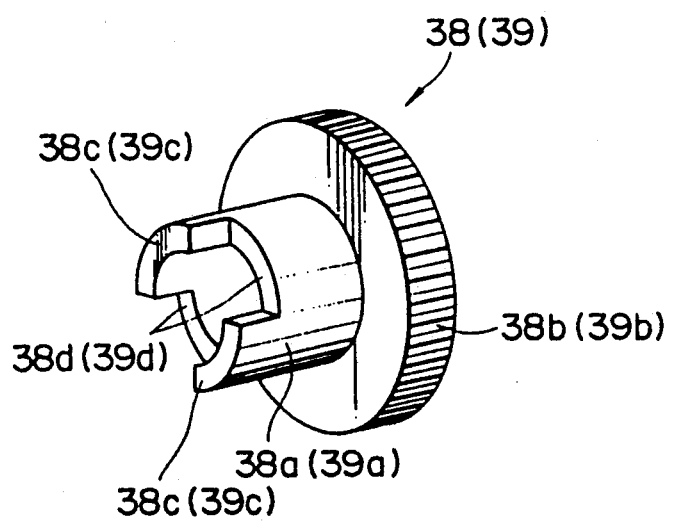
FIG. 3 is a perspective view illustrating the configuration of the partial gear as taken out of the slip clutch mechanism in which it is installed as shown in FIG. 1.

In the meanwhile, a pair of driven side pinions 38 and 39, which are to be set into their engagement respectively with the slip pinions 29 and 30 on the driving side, are fitted into the above-mentioned idle shaft 28 in a manner permitting the driven side pinions 38 and 39 to rotate freely. This single pair of pinions 38 and 39 are formed in identical shapes, as shown in FIG. 3. More specifically, these individual pinions 38 and 39 are provided with hollow shaft parts 38a and 39a having a relatively smaller diameter, into which the idle shaft 28 is inserted, and gear parts 38b and 39b formed in an integrated structure at one end each of these hollow shaft parts in a diameter relatively larger than the outside diameter of the hollow shaft parts 38a and 38b. On the other end of these hollow shaft parts 38a and 39b, engaging protrusions 38c and 39c, as well as engaging grooves 38d and 39d, are formed alternately at equal angle intervals. This single pair of pinions 38 and 39 are set in the outer circumference of the idle shaft 28 in directions opposed to each other, in such a manner that the respective engaging protrusions 38c and 39c and the engaging grooves 38d and 39d engaged mutually.

Then, the inner side slip washers 32 and 33, which are fitted into the clutch shaft 26, as well as the spacer ring 35, and the compression coil spring 36, are arranged with a pair of slip pinions 29 and 30 positioned in such a manner as to be within the extending sphere of the mutually integrated extending parts formed of the hollow shaft parts 38a and 39a of these driven side pinions 38 and 39. In other words, the position of arrangement of the stopper ring 37 mentioned above is regulated in this manner. As the result of this arrangement, the clutch shaft 26 and the idle shaft 28 are positioned closer together in their center distance, so that the slip clutch mechanism can be formed in a compact size. Further, the teeth part 38b of the pair of pinions 38 is in engagement with a first transmitting gear 42 set on the outer circumference of a first supporting shaft 40, axially supported in a manner permitting its rotation between the main plate 20 and the support plate 21.

First transmitting gear 42 engages, a second transmitting gear 44, which is set on the outer circumference of a second supporting shaft 43 axially supported in a manner permitting its rotation between the main plate 20 and the support plate 21. Second transmitting gear 44 engages with a third transmitting gear 46, which is rigidly mounted in coaxial arrangement on the outer circumference of the above-mentioned output shaft 17, by way of an idle gear 45, which is axially supported so as to permit its free rotation on the main plate 20. The rotating power of the one pinion 38 at the driven side will be transmitted to the output pinion 18 in regular sequence via the transmitting gear trains 42, 44, 45, and 46.

Now, a description will be made of the operations for the transmission of rotating power in the speed reducing motor unit 16 constructed in the manner described above.

First, the driving motor for zooming 22 will be started up in such a way as to drive the motor shaft 22a for its rotation either in the forward direction or in the reverse direction in accordance with the selected zooming direction when instructions are given for a zooming operation in the telescopic direction or in the wide angle direction by operations on a power zoom switch (not shown). This rotation of the motor shaft 22a will be transmitted to the clutch shaft 26 via the idle gear 24 and the input gear 27. Sliding does not occur in this motive power transmitting route.

When the clutch shaft 26 rotates in this manner, the slip washers 31, 32, 33, and 34 rotate as unified with the clutch shaft 26 by the effect of the relation of engagement of the non-circular shaft 26a of this clutch shaft 26 with the non-circular holes 31a, 32a, 33a, and 34a. Slip washers 31 and 32 are thrust at both of the right and left sides thereof by the slip pinion 29, working with the pressing force exerted by the compression coil spring 36. Also, the slip washers 33 and 34 are thrust at both of the right and left sides thereof by the slip pinion 30. The slip pinion 29 will therefore rotate as unified with the clutch shaft 26 by the effect of the frictional force generated between the slip washers 31 and 32 and the slip pinion 29. Also, the slip pinion 30 will similarly rotate as unified with the clutch shaft 26 by the effect of the frictional force generated between the slip washers 33 and 34 and the clutch shaft 26. The rotations of slip pinions 29 and 30 are transmitted to the driven side pinions 38 and 39, and the rotating force of the pinion 38 is transmitted to the output pinion 18 by way of the transmitting gear trains 42, 44, 45, and 46. Then, the cam ring 13 is put into its rotation by the rotation of output pinion 18, so that the variable magnification lens groups L1 and L2, being moved in the cam groove (not shown) formed in this cam ring 13, will perform their respective zooming operations.

In the meantime, the driving operation by the driving motor for zooming 22 will be stopped in response to a detection signal generated, for example, from an end sensor (not shown). When the cam ring 13 has reached an end in a zooming operation (which can be either an end for a telescopic operation or an end for a wide angle operation). However, until the driving operation by this driving motor for zooming 22 stops completely, the motor shaft 22a will continue to rotate. In the meanwhile, the output pinion 18 will be mechanically prevented from its rotation at an end point of a zooming operation. In this manner, sliding will occur between the slip pinion 29 and the slip washers 31 and 32, which are positioned respectively on both sides of the slip pinion 29, and between the slip pinion 30 and the slip washers 33 and 34, which are positioned respectively on both sides of the slip pinion 30, as observed in detail in the operations of this slip clutch mechanism 25.

The slip clutch mechanism 25, described in this example of a preferred embodiment, is capable of producing a larger sliding torque (namely, the torque at work when a slip takes place) in this sliding action in comparison with the corresponding conventional slip clutch mechanism. The reason is that the magnitude of the sliding torque will be dependent on the strength of the compression coil spring 36, when it is assumed that the area of the parts by which contact is formed between the slip pinions 29 and 30, and the slip washers 31 and 32 and the slip washers 33 and 34, these pairs of slip washers corresponding respectively to the slip pinions 29 and 30, is the same, and further that the winding diameter and so forth of the compression coil spring 36 are the same in the two slip clutch mechanisms under comparison.

In contrast with the conventional slip clutch mechanism, which generates sliding torque only with one pinion, the slip clutch mechanism in this example of a preferred embodiment produces sliding torque on one pair of slip pinions 29 and 30 by the action of one compression coil spring 36. As the result of this manner of generating sliding torque, the slip clutch mechanism in this example of a preferred embodiment will be capable of producing two times as much sliding torque as that generated by the conventional slip clutch mechanism, when it is assumed that the area of the parts by which contact is formed between the slip pinions 29 and 30 and the slip washers 31 and 32 and the slip washers 33 and 34, these pairs of slip washers corresponding respectively to the slip pinions 29 and 30, is the same and further that the winding diameter and so forth of the compression coil spring 36 are the same in the two slip clutch mechanisms under comparison.

Accordingly, the slip clutch mechanism according to the present invention will not be liable to be put into a situation where any slip ever occurs between the slip pinions 29 and 30 and the slip washers 31 and 32 and the slip washers 33 and 34, which correspond to these slip pinions, by the effect of the dead load of the variable magnification lens groups, even if the lenses are directed downward or directed upward.

Furthermore, it should be understood that the present invention is not limited in any way to this example of a preferred embodiment, but may be applied effectively to variously modified forms of its embodiment to such an extent as will not deviate from the essential technical scope defined in this Specification for the present invention.

For instance, the slip clutch mechanism according to the present invention, which has been described in the example of a preferred embodiment thereof given above in the form of its application to an electrically operated barrel for a zoom lens, is not to be limited to such an application, but can, of course, be employed as a slip clutch mechanism for any other apparatus which is required to permit a mechanical slip.

Furthermore, the slip pinions 29 and 30 are set to be movable in the axial direction on the clutch shaft 26 in the aforesaid embodiment. However, the present invention is not to be limited to such a construction, but can, of course, be employed as a slip clutch mechanism wherein the slip pinions 29 and 30 are rotatable but fixed relative to the axial direction. By employing such a construction, the slip washers 31 and 34 would be eliminated and the frictional engaging forces between slip pinion 29 and the slip washer 32, and between the slip pinion 30 and the slip washer 34 would be generated.

As described in detail hereinabove, the slip clutch mechanism according to the present invention is provided with parts for generating slips, namely, a pair of slip pinions and slip members to be put into contact with the slip pinions, on one clutch shaft, in a construction in which this one pair of slip members are brought into their contact with the slip pinions by the action of a compression coil spring member inserted between these slip pinions and the slip members and is therefore capable of generating a large sliding torque without any increase of space in the mechanism.

What is claimed is:

1. A slip clutch mechanism comprising:
    a clutch shaft which is rotated by a driving power source;
    at least one pair of slip pinions supported on the clutch shaft in such a manner as to be rotatable with respect to the clutch shaft;
    a pair of slip members supported on said clutch shaft in such a manner as to be rotatable as unified with said clutch shaft and movable in an axial direction of said clutch shaft and as to frictionally contact a pair of slip pinions at a respective inner side of each of said pair of slip pinions;
    compression spring means interposed between said pair of slip members and bringing said pair of slip members into frictional contact with said pair of slip pinions; and
    an output shaft rotated by at least one of said pair of slip pinions.

2. The sliding clutch mechanism according to claim 1, wherein
    said slip members comprise slip washers slidingly contracting side end surfaces of corresponding slip pinions.

3. The sliding clutch mechanism according to claim 1, further comprising:
    a spacer ring loosely fitted into an outer circumference of said clutch shaft, said spacer ring maintaining a position between said pair of slip members.

4. The slip clutch mechanism according to claim 3, wherein
    said compression spring means comprises a compression coil spring which loosely fits into an outer circumference of said spacer ring.

5. The slip clutch mechanism according to claim 1, in combination with:
    an idle shaft arranged in such a manner as to rotate freely around an axial line parallel to said clutch shaft, and
    driven side pinions installed on said idle shaft so as to be rotatable around said idle shaft and to engage with said pair of slip pinions.

6. The slip clutch mechanism according to claim 5, wherein
    said driven side pinions connect with each other in such a manner as to rotate in one block.

7. The slip clutch mechanism according to claim 6, wherein
    each of the driven side pinions is provided with a hollow shaft part formed in smaller diameter to be fitted into the idle shaft, and gear parts each formed in larger diameter on the outer circumference at one end of each of said hollow shaft parts, and
    said compression coil spring member and said pair of slip members are arranged such that they can be accommodate within the range of extension of the mutually connected hollow shaft parts of the driven side pinions.

8. The slip clutch mechanism according to claim 1,
    each of said pair of pinions is set to be movable in the axial direction of said clutch shaft.

9. The slip clutch mechanism according to claim 8, further comprising:
    a pair of additional slip members supported on said clutch shaft in such a manner as to be rotatable when unified with said clutch shaft and movable in the axial direction of said clutch shaft and frictionally contact said pair of slip pinions at the outer side of each of said slip pinions.

10. The sliding clutch mechanism according to claim 9, wherein
    said slip members and additional slip members comprise slip washers slidingly contacting side end surfaces of corresponding said slip pinions.

11. The sliding clutch mechanism according to claim 9, further comprising:
    a spacer ring loosely fitted into the outer circumference of said clutch shaft, said spacer ring maintaining its state of being positioned between the mutually facing slip members.

12. The slip clutch mechanism according to claim 11, wherein
    said compression spring means comprises a compression coil spring which is loosely fitted into the outer circumference of said spacer ring.

13. The slip clutch mechanism according to claim 9, wherein
    said clutch shaft includes a flange portion integral therewith; and
    said additional slip member frictionally engages with the outer end surface of said slip pinion on the side of said flange portion is brought into its contact with said flange portion by the pressing force exerted by said compression coil spring member.

14. The slip clutch mechanism according to claim 13, further comprising:
    a stopper ring engaged with the end part of said clutch shaft at the side opposite to the side where the flange portion is formed, and wherein
    said additional slip member which is frictionally engaged with outer end surface of said slip pinion on the side of said stopper ring contacts said stopper ring by pressing force exerted by said compression spring member.

15. The slip clutch mechanism according to claim 9, in combination with:
    an idle shaft arranged in such a manner as to rotate freely around an axial line parallel to said clutch shaft, and
    driven side pinions installed on said idle shaft so as to rotate freely around said idle shaft and to move freely along a line in the axial direction of said idle shaft and to respectively engage with said pair of slip pinions.

16. The slip clutch mechanism according to claim 15, wherein
said driven side pinions connect with each other so as to rotate in one block.

17. The slip clutch mechanism according to claim 16, wherein
each of said driven side pinions is provided with a hollow shaft part formed in smaller diameter to be fitted into said idle shaft, and gear parts each formed in larger diameter on the outer circumference at one end of each of said hollow shaft parts, and said compression coil spring member and said slip members are arranged in such a state that they can be accommodated within the range of extension of the mutually connected hollow shaft parts of said driven side pinions.

* * * * *

UNITED STATES PATENT AND TRADEMARK OFFICE
CERTIFICATE OF CORRECTION

PATENT NO. : 5,222,407
DATED : June 29, 1993
INVENTOR(S) : T. SEKIGUCHI

It is certified that error appears in the above-indentified patent and that said Letters Patent is hereby corrected as shown below:

At column 8, line 12 (claim 7, line 10) change "accommodate" to ---accommodated---.

At column 8, lines 15-16 (claim 8, lines 1-2), insert ---wherein--- between "claim 1," and "each".

At column 8, line 16 (claim 8, line 2), insert ---slip--- before "pinions".

Signed and Sealed this

Sixteenth Day of August, 1994

Attest:

BRUCE LEHMAN

Attesting Officer

Commissioner of Patents and Trademarks